United States Patent
Kulikovska et al.

(10) Patent No.: US 9,495,626 B2
(45) Date of Patent: Nov. 15, 2016

(54) IDENTITY CARD WITH PHYSICAL UNCLONABLE FUNCTION

(71) Applicant: BUNDESDRUCKEREI GMBH, Berlin (DE)

(72) Inventors: Olga Kulikovska, Berlin (DE); Manfred Paeschke, Wandlitz (DE); Walter Fumy, Erlangen (DE); Frank Morgner, Grunheide (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 14/436,253

(22) PCT Filed: Jul. 12, 2013

(86) PCT No.: PCT/EP2013/064834
§ 371 (c)(1),
(2) Date: Apr. 16, 2015

(87) PCT Pub. No.: WO2014/060126
PCT Pub. Date: Apr. 24, 2014

(65) Prior Publication Data
US 2015/0286914 A1    Oct. 8, 2015

(30) Foreign Application Priority Data
Oct. 18, 2012  (EP) .................................... 12188962

(51) Int. Cl.
*G06K 19/02*     (2006.01)
*G06K 19/06*     (2006.01)
(Continued)

(52) U.S. Cl.
CPC ......... *G06K 19/06037* (2013.01); *B42D 25/00* (2014.10); *G06K 19/0614* (2013.01); *G06K 19/06093* (2013.01); *B42D 25/328* (2014.10); *B42D 2035/36* (2013.01)

(58) Field of Classification Search
CPC  B42D 25/00; B42D 25/328; B42D 2033/04; B42D 2033/30; B42D 2035/24; B42D 25/47; B42D 2033/06; B42D 2033/14; B42D 2033/24; B42D 25/378; G06K 19/06037; G06K 19/06093; Y10T 156/1039
USPC ........................................ 235/488, 492, 380
See application file for complete search history.

(56) References Cited

U.S. PATENT DOCUMENTS 3,836,754 A      9/1974  Toye et al.
4,298,217 A *  11/1981  Moraw ................. B42D 25/00
                                                                  283/108

(Continued)

FOREIGN PATENT DOCUMENTS

CN    101263503 A    9/2008
CN    102104480 A    6/2011
(Continued)

OTHER PUBLICATIONS

European Patent Office, "European Search Report," issued for application No. EP/12188962.0, dated Mar. 22, 2013, 3 pages.
(Continued)

*Primary Examiner* — Thien M Le
(74) *Attorney, Agent, or Firm* — Loeb & Loeb LLP

(57) ABSTRACT

An identity card, comprising a card body and a physical unclonable function are arranged within the card body, wherein the physical unclonable function comprises a first light influencing layer and a second light influencing layer.

14 Claims, 6 Drawing Sheets

(51) Int. Cl.
*B42D 25/00* (2014.01)
*B42D 25/328* (2014.01)

(56) References Cited

U.S. PATENT DOCUMENTS

| | | | | |
|---|---|---|---|---|
| 5,292,616 | A * | 3/1994 | Fujita | G11B 7/0033 346/135.1 |
| 2004/0234816 | A1* | 11/2004 | Azakami | G06K 19/06196 428/844.6 |
| 2006/0249951 | A1* | 11/2006 | Cruikshank | B42D 25/351 283/92 |
| 2008/0231418 | A1 | 9/2008 | Ophey et al. | |
| 2009/0169776 | A1* | 7/2009 | Herslow | B42D 25/328 428/29 |
| 2009/0250158 | A1* | 10/2009 | Streb | B32B 38/10 156/219 |
| 2009/0317595 | A1* | 12/2009 | Brehm | B42D 25/328 428/172 |
| 2011/0011937 | A1* | 1/2011 | Holmes | B42D 25/29 235/488 |
| 2011/0174884 | A1* | 7/2011 | Endres | B32B 37/1207 235/488 |
| 2012/0187674 | A1 | 7/2012 | Zahedi | |

FOREIGN PATENT DOCUMENTS

| | | |
|---|---|---|
| CN | 102164754 A | 8/2011 |
| CN | 102265395 A | 11/2011 |
| DE | 2838795 A1 | 3/1980 |
| DE | 102009048870 B3 | 2/2011 |
| EP | 0778159 A1 | 11/1997 |
| GB | 1123274 A | 8/1968 |
| GB | 2304077 A | 12/1997 |
| WO | 2006056089 A2 | 6/2006 |
| WO | 2007087498 A2 | 8/2007 |
| WO | 2007087498 A3 | 8/2007 |

OTHER PUBLICATIONS

European Patent Office, "European Search Opinion," issued for application No. EP/12188962.0, dated Mar. 22, 2013, 2 pages.

International Searching Authority, "International Search Report," issued for application No. PCT/EP2013/064834, dated Aug. 6, 2013, 4 pages.

Thomas Esbach, Walter Fumy, Olga Kulikovska, Dominik Merli, Dieter Schuster, Frederic Stumpf: "A New Security Architecture for Smartcards Utilizing PUFs," ISSE 2012 Security Electronic Business Processes, Dec. 11, 2012, Springer Fachmedien Wiesaden, Hessen, Deutschland, 14 pages.

Lim, Daihyun; Lee, Jae W.; Gassend, Blaise; Suh, G. Edward; Van Dijk, Marten; Devadas, Srinivas: "Extracting secret keys from integrated circuits" IEEE Transactions on Very Large Scale Integration (VLSI) Systems vol. 13, No. 10, 2005, pp. 1200-1205.

Office Action in Chinese Application No. 2013800541871.7, dated Nov. 27, 2015, 8 pages.

* cited by examiner

IDENTITY CARD WITH PHYSICAL UNCLONABLE FUNCTION

FIELD OF THE INVENTION

The present invention relates to identity cards with physical unclonable functions (PUF).

RELATED TECHNOLOGY

Today, a wide variety of applications—from banking to access control to electronic passports—are based on identity cards, i.e. smart cards. These can be equipped with cryptographic modules and guarantee a high level of security for systems and users. However, designers and manufacturers of smartcards and security ICs are continuously aiming at further enhancing their cards' security.

In order to further improve security of an identity card, Physical Unclonable Functions (PUFs) can be provided. PUFs are functions embodied in physical structures which are easy to evaluate but hard to predict. Furthermore, implementations are difficult to duplicate, even if the exact manufacturing process is known and available. Consequently, security architectures based on PUFs promise inherent unclonability, physical tamper resistance and secure establishment of device-unique cryptographic keys. Well-known bare silicon PUFs aim at ensuring the security of the circuit itself but do not grant tamper resistance to the card in which it is embedded.

The challenge-response behaviour of a PUF is determined by sub-micron physical characteristics formed by manufacturing process variations which are not reproducible, not even by the original manufacturer. PUFs enable the generation of a device-unique secret based on physical properties rather than on binary memory mechanisms such as fuses. During the last decade, several PUF constructions have been proposed and realized as described in Lim, Daihyun and Lee, Jae W. and Gassend, Blaise and Suh, G. Edward and van Dijk, Marten and Devadas, Srinivas, Extracting secret keys from integrated circuits. In IEEE Transactions on Very Large Scale Integration (VLSI) Systems, volume 13, no 10, pages 1200-1205. IEEE, 2005. Further reference is made to Thomas Esbach, Walter Fumy, Olga Kulikovska, Dominik Merli, Dieter Schuster, Frederic Stumpf, "A new security architecture for smartcards utilising PUFs", to be published in "Securing Electronic Business Processes—Highlights of the Information Security Solutions Europe 2012 Conference".

PUFs are usually based on silicon structures and utilize tiny deviations in the electronic circuitry well below the tolerances of fabrication processes. These non-reproducible deviations make the circuitry unique and are often referred to as 'chip fingerprints'.

However, in spite of intensive research, PUF implementations remain few and far between and are rarely considered in the context of high-end security architectures.

SUMMARY

It is therefore the object of the invention to provide an efficient concept for providing identity cards with a PUF.

This object is achieved by the features of the independent claims. Further embodiments are disclosed in the description and the figures.

The invention is based on the finding that the above object can be achieved by arranging distinct light influencing layers at different levels in a transparent card body.

The light influencing layers can be formed by metal layers respectively comprising a pattern, e.g. a periodic pattern, of metal stripes forming a grating. A plurality of such light influencing layers arranged above each other may uniquely diffract and/or refract and/or reflect incident light and thus form a unique fingerprint identifying the identity card. Such light influencing layers can easily be implemented when manufacturing an identity card, by e.g. embedding the light influencing layers in a plastic, e.g. polymer card body, or by arranging the light influencing layers between transparent laminate layers of the identity card.

An advantage of the physical unclonable function is that it can comprise well macroscopically defined structures with non-random distribution in the card body which simplifies the manufacturing process and can allow optimization of light influencing in terms of sensitivity of the measuring system. At the same time the uniqueness of each fabricated structure and correspondingly of its optical response can be provided by the smallest tolerances of the fabrication process on the microscopic level and thus is intrinsic to those PUFs.

According to a first aspect, the invention relates to an identity card, comprising a card body and a physical unclonable function arranged within the card body, wherein the physical unclonable function comprises a first light influencing layer and a second light influencing layer.

The physical unclonable function is arranged to provide an optical fingerprint of the identity card or a kryptographic key. Therefore, the corresponding material structure can have at least partially the optical properties that are different from the card body, for example a light transmittance which is smaller than the light transmittance of the card body, with regard to white light or ultra violet light or infrared light. The card body can be light transparent and may be composed of one or more plastic layers such as polymer layers, in particular laminated plastic layers.

The first light influencing layer and the second light influencing layer can respectively have planar surfaces.

The light influencing introduced by the respective light influencing layer can be a reduction of light transmittance with respect to the card body or an amendment, e.g. increase or decrease of reflectivity, refraction or diffraction with respect to the card body. The light influencing can comprise scattering, diffracting, refracting, reflecting and/or transmittance reduction.

According to an embodiment, the first light influencing layer and the second light influencing layer have light transmittances which are smaller than a light transmittance of the card body. The first light influencing layer and the second light influencing layer can be e.g. refractive layers and/or diffractive layers and/or reflective layers and/or at least partially opaque layers. Thereby, an optical fingerprint of the identity card can be obtained.

According to an embodiment, the respective light influencing/influencing layer is an optically linear layer or an optically nonlinear or optically excited layer.

According to an embodiment, the optically linear layer is one of the following layers: a metal layer or a printing ink layer or a nanoparticle layer or a layer having a light refraction index which is different, e.g. greater or smaller, than a light refraction index of the card body, or a diffractive layer, wherein the optically nonlinear layer is a nonlinear material layer, and wherein the optically excited layer is a fluorescent material layer.

According to an embodiment, the first light influencing layer and the second light influencing layer are arranged above each other, e.g. exactly each other within a tolerance, e.g. 1% or 5% or displaced with respect to each other.

According to an embodiment, the first light influencing layer and/or the second light influencing layer comprises spaced surface elements, in particular stripes or rectangles or circular elements or oval elements.

The term "surface elements" referred to herein denotes according to some implementations flat elements having a thickness smaller than distance between the layers. The surfaces can be planar surfaces. Unlike particles, the surfaces of the surface elements are formed by surface areas which can be directed towards e.g. a light source arranged on the card body.

According to an embodiment, the first light influencing layer comprises a pattern, in particular a periodic pattern or a non-periodic pattern or a grating, of spaced surface elements having smaller transmittance than the card body, and wherein the second light influencing layer comprises a pattern, in particular a periodic pattern or a non-periodic pattern or a grating, of spaced surface elements having smaller transmittance than the card body.

According to an embodiment, the respective pattern is one-dimensional or two-dimensional. The respective one-dimensional pattern may comprise a plurality of stripes arranged next to each other so as to form a pattern structure. The respective two-dimensional pattern may comprise a plurality of areas e.g. periodically arranged so as to form a two-dimensional grid. The respective pattern can be periodic so as to form a grating, or non-periodic, forming e.g. a non-periodic 2D structure which can be provided by dots, in particular ink dots.

According to an embodiment, the first light influencing layer comprises a first periodic pattern of spaced surface elements, wherein the second light influencing layer comprises a second periodic pattern of spaced surface elements, and wherein the first periodic pattern of spaced surface elements and the second periodic pattern of spaced surface elements are arranged above each other. The spacing between the spaced surface elements can have a wavelength-scale dimension.

According to an embodiment, the spaced surface elements of the first light influencing layer and the spaced surface elements of the second light influencing layer are arranged exactly above each other within a tolerance, e.g. 1%, 2% or 5% of a surface width, or wherein the first periodic pattern and the second periodic pattern are displaced with respect to each other.

The respective the spaced surface elements can be of equal size or can have different size. Moreover, a distance between the respective spaced surface elements or a lateral displacement can be equal on can vary. According, in the case of periodic structures, the respective periods can be equal or can be different. Moreover, the spaced surface elements can be formed by dots, stripes, rectangular areas, circular areas or oval areas.

The spaced surface elements of the first light influencing layer have can have smaller or bigger or wider or thinner surfaces than the spaced surface elements of the second light influencing layer.

According to an embodiment, the surfaces of the spaced surface elements of the first light influencing layer have equal or different dimensions than surfaces the spaced surface elements of the second light influencing layer.

Moreover, the surface elements of the first light influencing layer may extend over the surface elements of the second light influencing layer. According to some implementations, the surface elements of the first light influencing layer are not completely covered by surface elements of the second light influencing layer so that light emitted towards the second light influencing layer from a surface of the card body can at least partially reach the first light influencing layer when being arranged behind the second light influencing layer.

According to an embodiment, the respective light influencing layer comprises spaced surface elements respectively having surface or thicknesses dimensions comparable to the wavelength, or wherein the respective light influencing layer comprises spaced surface elements respectively spaced apart by a wavelength-scale distance, or wherein a distance between the first light influencing layer and the second light influencing layer is of wavelength scale.

The term "wavelength scale" referred to herein refers to a magnitude of one or several, e.g. 10, wavelengths.

According to an embodiment, the first light influencing layer and the second light influencing layer jointly form an optical lens, in particular an optical microlens.

According to an embodiment, the card body comprises laminated transparent layers, wherein the first light influencing layer is arranged between successive two laminated transparent layers of the card body, and wherein the second light influencing layer is arranged between successive two laminated transparent layers of the card body.

According to an embodiment, the identity card further comprises a light source for emitting light towards the first light influencing layer and the second light influencing layer, and an optical sensor for sensing light from the first light influencing layer and the second light influencing layer in response to the emitted light. The light source and the optical sensor are arranged on a surface of the card body such that the second influencing layer is closer to the optical sensor than the first influencing layer.

According to an embodiment, the identity card comprises an integrated circuit comprising the optical sensor. The integrated circuit may be formed by an ID chip arranged on a surface of or in the card body.

According to an embodiment, the identity card is an identity document or a smart card or a credit card.

According to some implementation forms, a card body area around the optical sensor or the integrated circuit can be less transparent than other card body areas. Thereby, the optical sensor or the integrated circuit can be more effectively protected.

According to an embodiment, the identity card is at least partially formed by a transparent polymer. The identity card can have a plurality of laminated polymer layers.

According to an embodiment, the first light influencing layer is formed by a first arrangement of light reflecting elements being arranged in a first card body area, and the second light influencing layer is formed by a second arrangement of light reflecting elements being arranged in a first card body area.

The reflectivity of the respective arrangement of light reflecting elements is determined as a fraction of reflected light by the respective arrangement of light reflecting elements. Preferably, all arrangement of light reflecting elements have reflectivities exceeding a predetermined threshold to ensure that even the most distant arrangement of light reflecting elements can reflect enough light to be sensed on a surface of the card body by the sensor. Thus, the required reflectivities of the arrangements of light reflecting elements can be determined in dependence on a sensitivity or resolution of an optical sensor sensing the reflected light on a surface of the card body.

The physical unclonable function is arranged to provide an optical fingerprint of the identity card or a kryptographic key. The card body can be light transparent and may be composed of one or more plastic layers such as polymer layers, in particular laminated plastic layers.

The arrangement of light reflecting elements can be formed by metal layers respectively comprising a periodic pattern of metal stripes forming a grating. A plurality of such arrangement of light reflecting elements arranged above each other may uniquely diffract and/or refract and/or reflect incident light and thus form a unique fingerprint identifying the identity card. Such arrangement of light reflecting elements can easily be implemented when manufacturing an identity card, by e.g. embedding the arrangement of light reflecting elements in a plastic, e.g. polymer card body, or by arranging the arrangement of light reflecting elements between transparent laminate layers of the identity card.

According to an embodiment, the second arrangement of light reflecting elements is arranged closer to at least one common surface point on a surface of the card body than the first arrangement of light reflecting elements.

According to an embodiment, the identity card comprises only arrangements of light reflecting with reflectivities being greater than or equal to a predetermined reflectivity threshold, e.g. 5% or 10% the maximum reflectivity. Accordingly, the second arrangement of light reflecting may have a reflectivity of 100%.

According to an embodiment, the identity card comprises only N arrangements of light reflecting elements, each of the N arrangements of light reflecting elements being arranged in a different card body area at a different distance from a common surface point on a surface of the card body, and wherein a light reflectivity of the arrangements of light reflecting elements increases, in particular linearly or along a gradient, with increasing distance of the arrangements of light reflecting elements from the common surface point.

According to an embodiment, the light reflecting elements of the first arrangement of light reflecting elements and of the second arrangement of light reflecting elements are respectively formed by reflective particles being arranged to form the respective arrangement of light reflecting elements, or by planar surface elements, in particular metal stripes or metal rectangles or metal circular elements or metal oval elements, being arranged to form the respective arrangement of light reflecting elements.

According to an embodiment, a density of the light reflecting elements of the first arrangement of light reflecting elements in the first card body area is greater than a density of the light reflecting elements of the second arrangement of light reflecting elements in the second card body area.

According to an embodiment, the light reflecting elements of the first arrangement of light reflecting elements have bigger reflective surfaces than the light reflecting elements of the second arrangement of light reflecting elements.

According to an embodiment, the intensities of light reflected by the first arrangement of light reflecting elements and the second arrangement of light reflecting elements at a common surface point on a surface of the card body are identical within an identity range.

According to an embodiment, the light reflecting elements of the respective arrangement of light reflecting elements are statistically or regularly arranged within the respective card body area.

According to an embodiment, the light reflecting elements of the first arrangement of light reflecting elements and of the second arrangement of light reflecting elements respectively form reflective layers.

According to an embodiment, the reflective layers are planar reflective layers arranged at different distances with respect to a surface of the card body, or wherein the reflective layers are arranged along curvatures, in particular spherical curvatures, with different radiuses towards a common center point, the common center point being a common surface point on a surface of the card body or being above or beneath the surface of the card body.

According to an embodiment, the wherein the light reflecting elements of the first arrangement of light reflecting elements and the light reflecting elements of the second arrangement of light reflecting elements are respectively arranged to form a periodic pattern, in particular a grating.

According to an embodiment, a difference between the reflectivity of the first arrangement of light reflecting elements and the second arrangement of light reflecting elements is greater than or equal to a predetermined threshold. The predetermined threshold can be e.g. determined by a fraction resulting from dividing 10% by a number of arrangement of light reflecting elements. However, the predetermined threshold can be set to 5% or 10% the reflectivity of the most reflective arrangement of light reflecting elements. Moreover, the threshold can be defined by the light sensitivity or light resolution of an optical sensor which may sense the reflected light.

According to a second aspect, the invention relates to method for manufacturing an identity card, the method comprising providing a plurality of transparent laminate layers, arranging a first light transmittance between successive transparent laminate layers and arranging a second light transmittance between successive transparent laminate layers to obtain a physical unclonable function, and laminating the transparent laminate layers and the physical unclonable function to obtain the identity card.

Further method steps of the method for generating an identity card are directly derivable from the features of the identity card.

BRIEF DESCRIPTION OF THE DRAWINGS

Further embodiments will be described with respect to the accompanying figures, in which.

DETAILED DESCRIPTION

Figure 1:
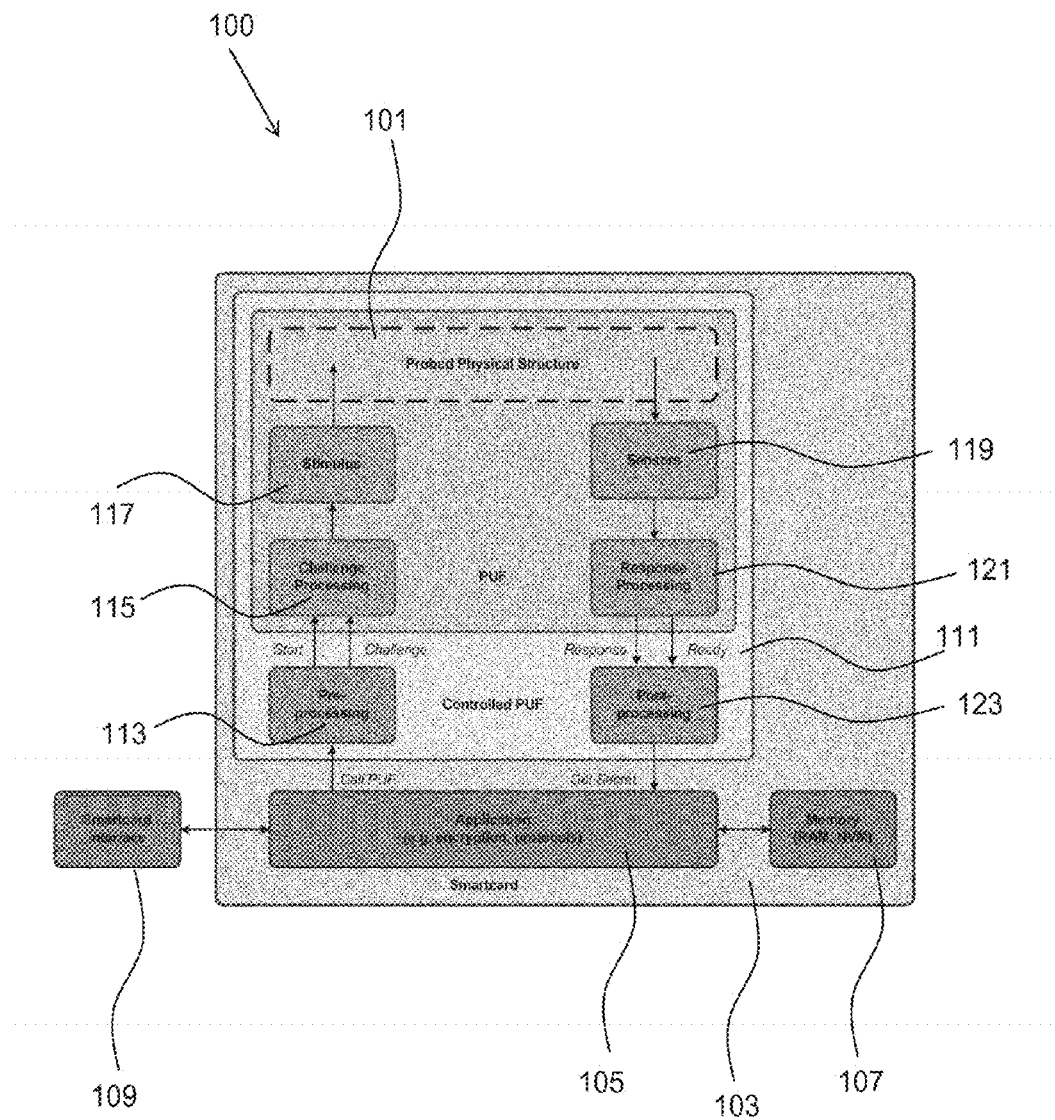
FIG. 1 shows an identity card with PUF.

FIG. 1 shows an identity card 100 according to an embodiment.

The identity card 100 comprises a card body 101 with a PUF 101 which is arranged within a card body and forms a probed physical structure. The card body is not explicitly shown in FIG. 1.

The identity card 100 further comprises an integrated circuit 103, e.g. a card chip, for integrating the circuitry for the PUF measurements, pre- and post-processing and the memories and applications into a complex material structure which is stimulated and measured by the enclosed optional integrated security function 105. The integrated security function 105 is configured to implement an application such as encryption or protocols.

The integrated circuit 103 further comprises an optional memory 107 coupled to the integrated security function 105, and an interface 109 for communicating with the integrated security function 105.

The integrated circuit 103 further implements an control function 111 for controlling the PUF 101, wherein the control function 111 e.g. comprises an optional pre-processing 113, an optional challenge processing 115, and a stimulus 117 for stimulating the PUF 101 e.g. with light. The stimulus 117 may comprise a light emitting element such as a LED or a LED array.

The control function 111 further comprises one or more sensors 119 for sensing light from the PUF 101 in response to the stimulus generated by the stimulus 117, an optional response processing 121 and an optional post-processing 121.

As shown in FIG. 1, the integrated circuit 103, e.g. a security chip, is connected with the card body both physically and logically so that the integrated circuit 103 is able to verify the integrity of its surroundings.

According to some embodiments, the integrated security function 105 may output a Call PUF signal towards the pre-processing 113 which in response thereto may generate output start and challenge signals towards the challenge processing 115 to trigger the stimulus 117 to e.g. emit light towards the PUF 101.

The light response from the PUF 101 is sensed by the sensor 119 providing a sensor signal to the response processing 121. The response processing 121 generates in response thereto the response and ready signals which are provided to the post-processing 123. The post processing 123 which provides a get secret signal to the integrated security function 105 for e.g. encryption.

According to some embodiments, a device-unique material structure forming the PUF as e.g. key storage or optical fingerprint can be used which can have multiple advantages. Because the material carries the secrets, it is possible to bind a system to a physical object, which is one of our primary goals. Furthermore, invasive influencings would probably change or destroy the material and thereby render the embedded secret useless.

For the scenario of an identity card as a smartcard, the choice of an optical PUF is favourable. Optical measurements are robust against Electro-Magnetic Interference (EMI) and in addition not only enable the use of the card body as the physical structure to be measured, but also provide the possibility of involving the printing on the card. However, resource constraints in smartcards, e. g. limited power consumption as well as static placement of the optical measurement mechanisms, do not allow the reading of optical PUFs by modulating, moving or tilting the laser beams.

One way to generate several different light stimuli by or within the integrated circuit 103 is the integration of an LED array in the stimulus 117.

In general, the challenge-response behaviour of the PUF 101 can be complex in order to resist model-building attacks and to provide enough entropy for the desired applications.

According to some embodiments, the controlled PUF 101 is integrated in order to protect against modelling attacks and ensure secure usage of the PUF 101, e. g. for key embedding and reconstruction. Following the principles of a controlled PUF, not only does the material enclosure protect the inner circuits, but the control circuits also protect the system from read-out or other methods of unauthorized access to the core of the PUF 101 which could enable modelling attacks. Because of this, a component having access to the challenge-response interface of the PUF 101 can be the control logic circuitry implementing the control function 111. All other application logics on the identity card can communicate with the control logics in order to make use of the functionality of the PUF 101. As a result, mutual protection of control logic circuits and PUF structure can be achieved.

Figure 2:
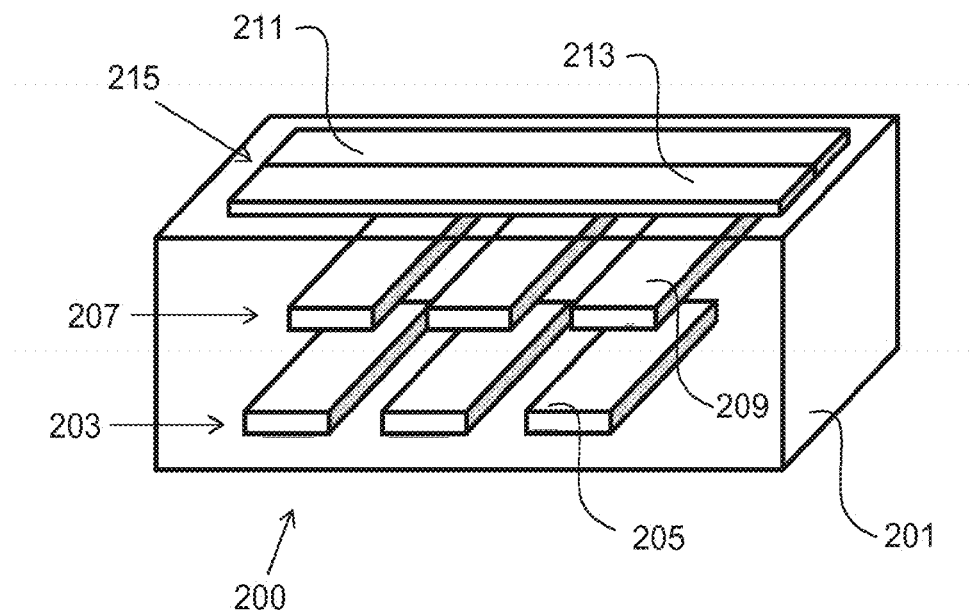
FIG. 2 shows an identity card.

FIG. 2 shows an identity card 200, comprising a card body 201 and a physical unclonable function 203, 207 arranged within the card body 201, wherein the physical unclonable function comprises a first light influencing layer 203 and a second light influencing layer 207.

The first light influencing layer 203 comprises spaced surface elements 205, e.g. metal stripes, being arranged to form a one dimensional periodic pattern (grating). Accordingly, the second light influencing layer 207 comprises spaced surface elements 209, e.g. metal stripes, being arranged to form a one dimensional periodic pattern (grating). The first light influencing layer 203 and the second light influencing layer 207 are arranged above each other within the card body 201, which is more transparent than the spaced surface elements 205, 209. The card body 201 can be formed from a transparent polymer.

The surface elements 205, 209 have dedicated surfaces being directed towards the optional light source 211, i.e. stimulus, arranged e.g. in the card body 201. The light source 211 may comprise an LED or a LED array. Thus the surface elements 205, 209 form light barriers interacting with the light, e.g. reflecting, refracting or diffracting light emitted by the light source 211 towards the surface elements 205, 209.

The identity card further comprises a sensor 213 for sensing light from the surface elements 205, 209 in response to the light emitted by the light source 211.

The light source 211 and the sensor can be integrated within an integrated circuit 215, which may have the architecture as shown in FIG. 1.

The first light influencing layer 203 and the second light influencing layer 207 collectively form the PUF as a probed physical structure arranged in a probed volume $V_p$.

The maximum amount of information that can be extracted from a PUF increases with the space that can be measured e.g. by the chip, i.e. the integrated circuit 215. The card area that can be accessed by the measurement is the probed volume $V_p$.

According to some embodiments, the size of the probed area is defined on the one hand by chip specifications—such as measurement sensitivity and relative positions of light sources and sensors—and on the other hand by the influencing properties of the card materials. The optical properties can be optimized in terms of both the sensitivity of the sensors and the desired penetration depth. A parameter which can be considered is the back-influencing of light, since the sensors on the chip measure only the light that is reflected or scattered back to the integrated circuit 215. This can be demonstrated using the one-dimensional model structure consisting of N equal partially reflective layers, each with reflection R. Intensities of light emitted and reflected by a single layer n are given by formula $I_{tn}=(1-R)I_{t(n-1)}$ and $I_{rn}=RI_{t(n-1)}$ respectively, where $I_{t(n-1)}$ is intensity of light emitted by the previous layer. The total intensity of light reflected by the stack of k layers is given by formula $$I_{rk} = \sum_{n=1}^{k} I_{rn}.$$

Figure 3:
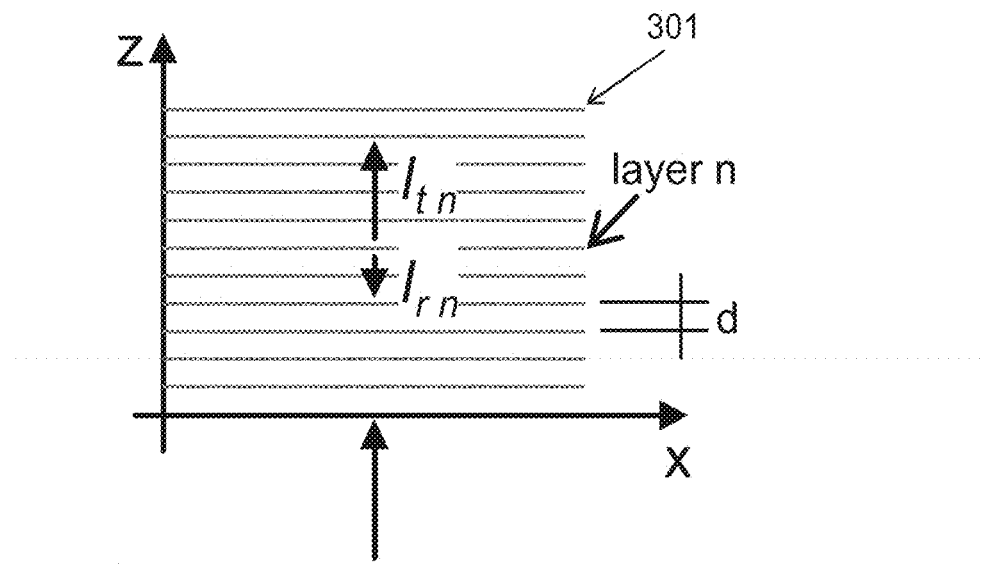
FIG. 3 shows a stack of light influencing layers.

FIG. 3 shows a stack of k (k=1/N) light influencing layers 301 collectively forming a PUF. The light influencing layers 301 may be reflective layers respectively comprising a grating of surface elements such as metal stripes.

Figure 4:
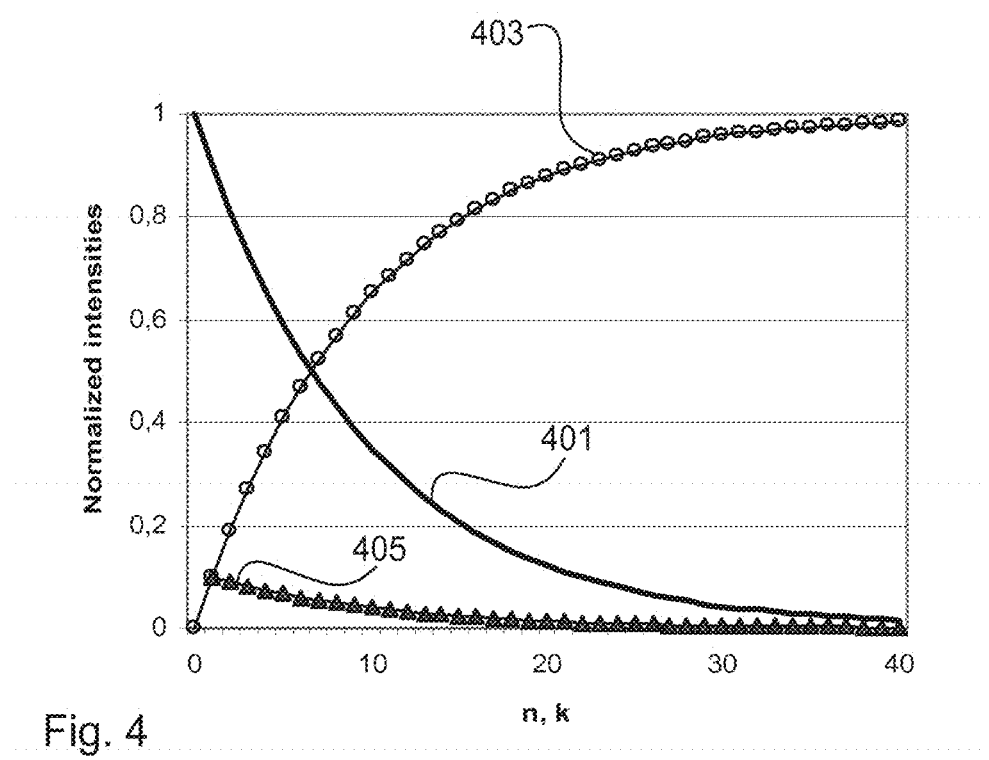
FIG. 4 shows intensities of light.

FIG. 4 depicts the intensities of light emitted and reflected by the stack of k (k from 1 to N) light influencing layers 301 as well as the intensity of light reflected by a single layer n. In particular, FIG. 4 shows normalized intensities of light transmitted 401 (solid line), reflected 403 by the stack of k layers (circles) and reflected 405 by a single layer n (triangles).

The contribution from a single layer decreases with the layer number n. For example, if a single layer reflects 10% of light (R=10%), the maximum contribution from a single layer to the signal does not exceed 10% and the contribution from the $24^{th}$ layer becomes smaller than 1%. The contribution from the remaining N−24 layers does not exceed 8% of the total signal. This model clearly shows the relation between sensitivity of sensor, material structure and the maximum size of the probed physical structure.

The maximum amount of information that can be obtained from a probed area with an optical PUF can be roughly estimated, assuming that the smallest material structure that can be resolved by optical measurement has a size comparable to the wavelength $\lambda$ of the probing light. The probed volume $V_p$ can be divided into $N_e$ elementary volumes $\lambda^3$. In the simplest case, each elementary volume represents 1 bit of information and the maximum amount of information is given by the number of elementary volumes $N_e = V_p / \lambda^3$.

For example, from a volume $V_p$ of size $1.0 \times 1.0 \times 0.3$ mm$^3$ probed by a wavelength of 700 nm, one can extract a maximum of $8.7 \times 10^5$ bits.

With regard to light propagation and in order to describe the properties of light distribution at the exit surface of the medium, the influence of fabrication tolerances on the resulting light distribution and in order to relate the optimum medium structure and size to the integrated measuring means, the theoretical light propagation in the designed media can be calculated.

The calculation approach can, by way of example, be based on elementary structures. A disordered structure is mathematically resolved into a finite series of elementary periodical structures. Light propagation in such structures can be numerically calculated in a volume compared to the probed volume $V_p$. Any single parameter of the structure, like the number of layers, period, contrast or spatial shift, can be independently varied and the resulting change in light distribution can be calculated.

Figure 5:
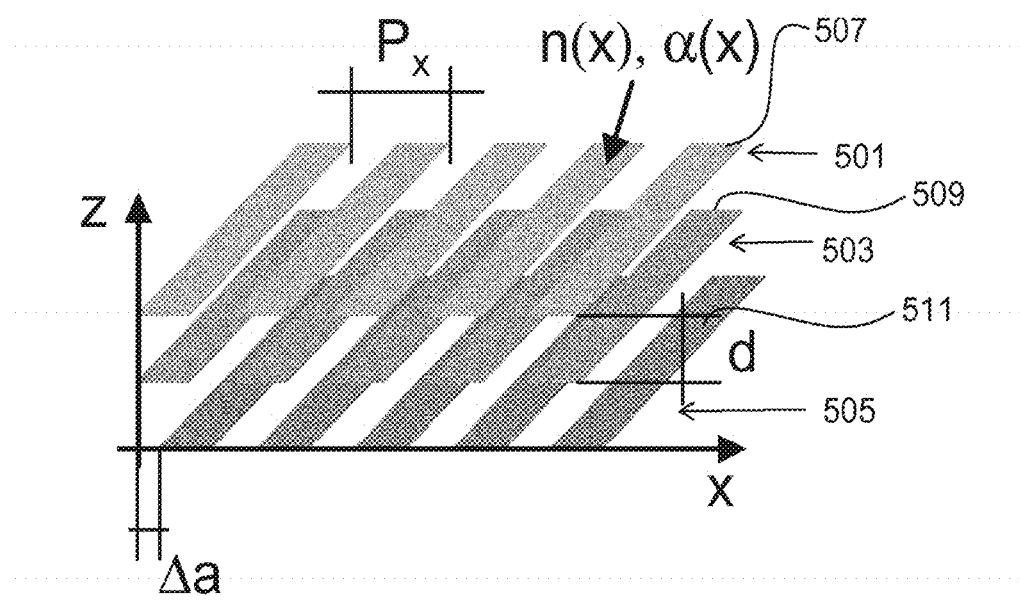
FIG. 5 shows a schematic diagram of a stack of three light influencing layers.

FIG. 5 shows a schematic diagram of a stack of three light influencing layers 501, 503, 505, respectively comprising spaced surface elements 507, 509, 511, e.g. metal stripes, being arranged to form a periodic pattern (grating). The grating can be characterized by modulated refraction and absorption n(x), Δ(x), period $P_x$, layer distance d and a relative layer shift Δa.

In order to determine the arrangement and/or structure of the light influencing layers 501, 503, 505, the so called stitch method can be employed. According to the stitch method, a volume is divided in a plurality of sub-volumes with e.g. 30×30×30 μm3 or elementary structures. The light distribution can then be determined for each sub-volume or elementary structure The light influencing layers 501, 503, 505, are arranged above each other, with or without a displacement in x direction. Furthermore, the surfaces of the spaced surface elements 507, 509, 511 can be aligned to show in the same direction, i.e. having normal showing in the z-direction and/or can be inclined with normal showing in the z-x-direction.

Figure 6A:
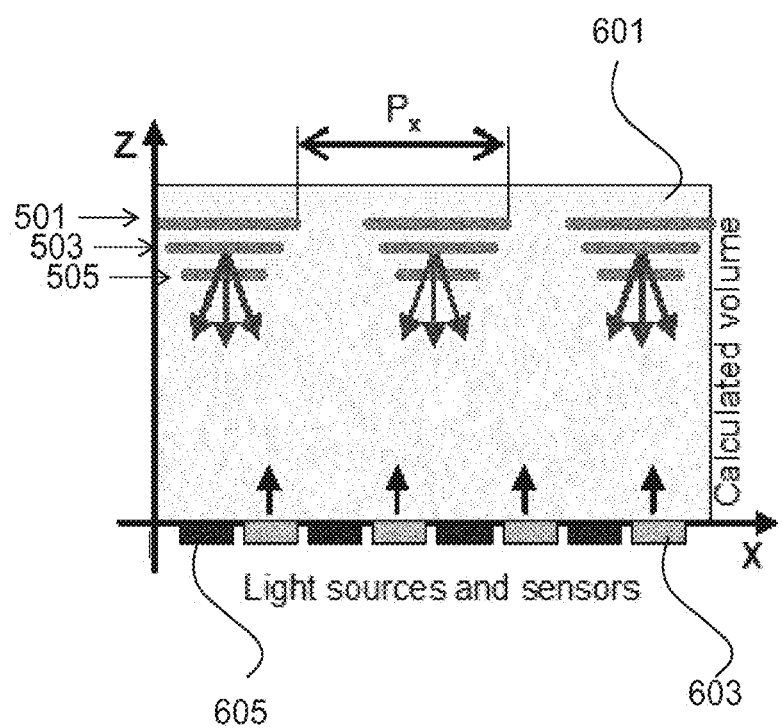
FIG. 6*a*, 6*b*, 6*c* show the light influencing layers.
Figure 6B:
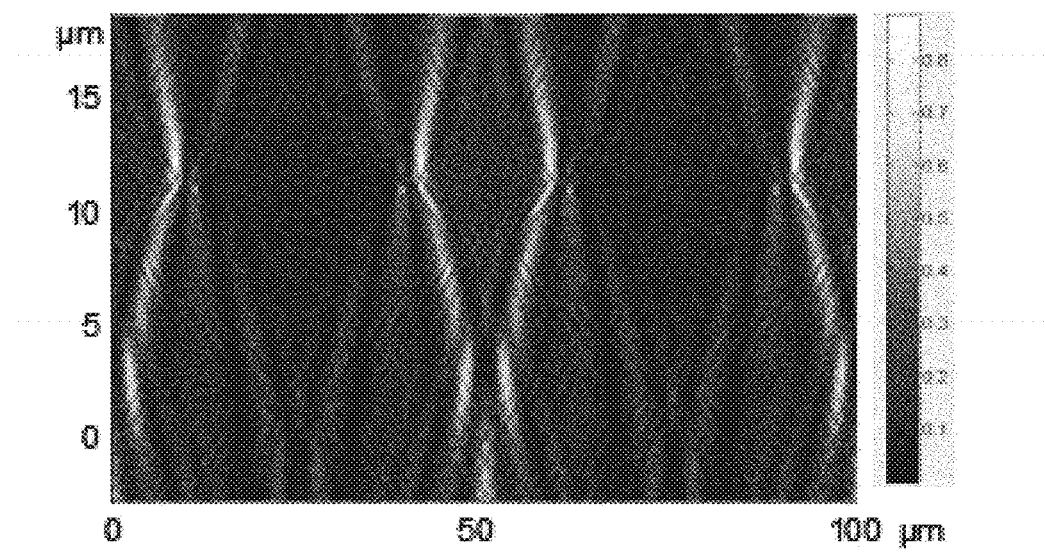
Figure 6C:
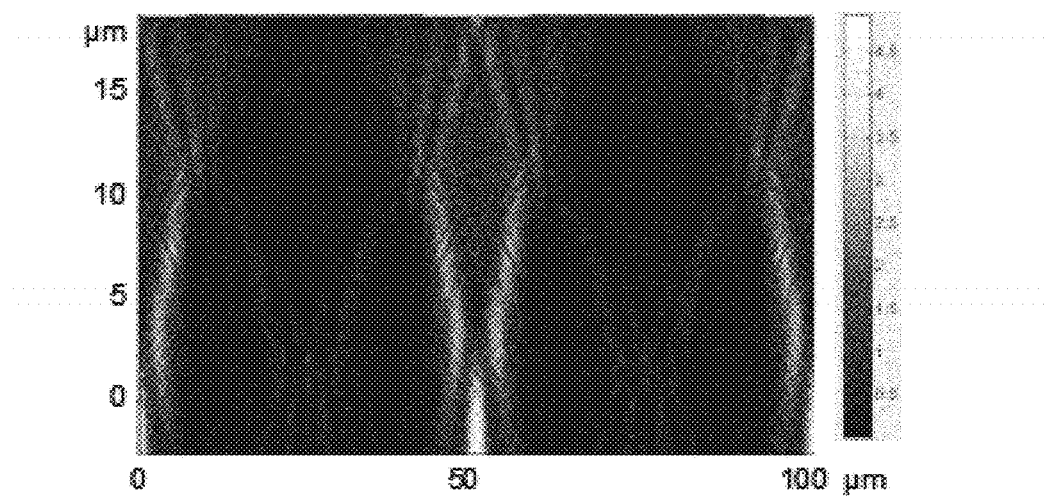

FIG. 6a shows the light influencing layers 501, 503, 505 shown in FIG. 5, which are arranged within a transparent card body 601 of an identity card 600. The identity card further comprises a plurality of light sources 603 and a plurality of light sensors 605. FIGS. 6b and 6c show corresponding light distributions obtained for reflective layer thicknesses of 10 nm, FIG. 6b, and 20 nm, FIG. 6c.

The light influencing layers 501, 503, 505 can comprise spaced surface elements being formed by thin (compared to the distance between the layers) metal stripes embedded in a transparent polymer material forming the card body 601. The metal stripes can have different, e.g. staggered, widths as shown in FIG. 6a. The cross section of the structure is shown schematically in FIG. 6a. The period $P_x$ between subsequent spaced surface elements can set to 50 μm (wavelength-scale), and the distance between the light influencing layers 501, 503, 505 to about 100 nm (wavelength-scale).

The thickness of the light influencing layers 501, 503, 505 can be varied between 10 and 30 nm or even 300 nm. The volume can be illuminated with parallel light of a wavelength of 630 nm under normal incidence.

The graphs of FIGS. 6b and 6c show the resulting spatial distributions of light intensity normalized to the intensity of incident light. There is a difference in the light distribution for the different metal layer thicknesses of 10 and 30 nm. The latter results in a focussed light thus in even a further improved contrast of the light pattern. Furthermore, the light is redistributed by the structure in the entire calculated volume while the distribution changes with distance from the structure. The distribution achieves higher contrast at some distance, while in the area close to the structure the contrast and the characteristic size of the light spots remain smaller. The results show how the light distribution is affected by a 20 nm difference in layer thickness.

In the following, the material selection for the light influencing layers will be addressed.

The light influencing layers can have a different light characteristic, e.g. transmittance, then the card body surrounding the light influencing layers. According to some embodiments, the light influencing layers can be structured using known card production techniques, including printing, spraying, dispersing, embossing or vacuum deposition techniques as well as holographic recording.

Most optical materials do not interact with light, thus providing simultaneous and linear response. The signal from a PUF based on such materials is measured by a sensor at the same moment as the light is emitted by a light source and its value is proportional to the intensity of the probe light.

Under the assumption that sensors integrate light over time $t_m$, the type of suitable materials can be extended by material that can interact with light within time $<t_m$. Optically non-linear materials change their optical properties under irradiation. This change is strongly dependent on the light intensity, is induced within a very short time and relaxes after the light is switched off. Fluorescent materials absorb light in one spectral region and emit it in another, usually red-shifted, spectral region. Emission follows absorption within a very short time and depends strongly on the molecular surroundings of the emitting units. Typical emission times are within the range of 0.5 to 20 ns.

Of particular interest are time-resolved or time-delayed measurements, where the response is measured with some delay relative to the probe light flash. An approach of this kind only makes sense if the material response changes reversibly during or after irradiation. Photochromic materials are examples of such materials. Under irradiation with actinic light, the photochromic unit undergoes a transformation to its other form, which has a different absorption spectrum. Relaxation to the initial form occurs thermally or under irradiation. The most effective photochromic materials are stilbenes, spiropyranes, azobenzenes as well as bacteriorhodopsin.

The material types and their related properties are summarized in Table 1.

TABLE 1

Material overview and properties

| Material types | Related properties |
| --- | --- |
| Optically linear: printing inks, metallic inks, dispersed micro and nano-particles, materials with high refractive indices | Simultaneous response: response depends on light intensity; broadband absorption spectra; probing with different wavelengths is desirable in order to increase variation of PUF response. |
| Optically nonlinear: variety of nonlinear polymers, bacteriorhodopsin | Simultaneous response: response changes with time, but the response time is very short (shorter than measurement time); response depends on light intensity; nonlinear effects require very high light intensities or electrical fields. |
| Optically excited: fluorescent materials | Simultaneous response (µs): response is spectrally shifted relative to the excitation; typical excitation in UV or blue region of VIS; requires sensor sensitivity in different spectral regions. |
| Optically or thermally excited: photochromic polymers, thermochromic polymers | Time-resolved response: change their colour under irradiation or heat; response depends on light intensity (or heat); response time varies widely (from ms to minutes) depending on material structure; relaxation may last even longer; typically require irradiation in UV or blue region of VIS; response depends on the modulation frequency. |
| Optically excited: phosphorescent materials | Time resolved response (seconds to hours): very long relaxation time. |

Regarding the light generation and measurement, the integration of light sources and sensors into the security chip (integrated circuit) that is embedded in the card can be performed.

According to some embodiments, the structure of the PUF can be used for generating an encryption key, wherein authentication by a challenge-response protocol directly using the unique mapping of challenges to responses of a PUF can be provided.

According to some embodiments, material-based PUFs can be used where the measurement circuitry is integrated into the smartcard controller and the PUF structure is part of the card material surrounding the chip. Such PUF system is considered resistant against laser fault injection attacks and micro probing, since any physical change results in different measurement data and therefore in altered PUF responses.

The invention claimed is:

1. An identity card, comprising:
a card body comprising laminated transparent layers; and
a physical unclonable function arranged within the card body;
wherein the physical unclonable function comprises a first light influencing layer and a second light influencing layer, the first light influencing layer is arranged between successive two laminated transparent layers of the card body, and the second light influencing layer is arranged between successive two laminated transparent layers of the card body.

2. The identity card of claim 1, wherein the first light influencing layer and the second light influencing layer have light transmittances which are smaller than a light transmittance of the card body.

3. The identity card of claim 1, wherein the first light influencing layer or the second light influencing layer comprises an optically linear layer, an optically nonlinear layer, or an optically excited layer.

4. The identity card of claim 3, wherein the optically linear layer is one of the following layers:
a metal layer or
a printing ink layer or
a nanoparticle layer or
a layer having a light refraction index which is different than a light refraction index of the card body, or
a diffractive layer,
wherein the optically nonlinear layer is a nonlinear polymer layer, and wherein the optically excited layer is a fluorescent material layer.

5. The identity card of claim 1, wherein the first light influencing layer or the second light influencing layer comprises spaced surface elements, in particular stripes or rectangles or circular elements or oval elements.

6. The identity card of claim 1, wherein the first light influencing layer comprises a pattern, in particular a periodic pattern or a non-periodic pattern or a grating, of spaced surface elements having smaller transmittance than the card body, and wherein the second light influencing layer comprises a pattern, in particular a periodic pattern or a non-periodic pattern or a grating, of spaced surface elements having smaller transmittance than the card body.

7. The identity card of claim 6, wherein the respective pattern is one-dimensional or two-dimensional.

8. The identity card of claim 1,
wherein the first light influencing layer comprises a first pattern of spaced surface elements,
wherein the second light influencing layer comprises a second pattern of spaced surface elements, and
wherein the first pattern of spaced surface elements and the second pattern of spaced surface elements are arranged above each other.

9. The identity card of claim 8,
wherein the spaced surface elements of the first light influencing layer and the spaced surface elements of the second light influencing layer are arranged exactly above each other within a tolerance; or
wherein the first pattern and the second pattern are displaced with respect to each other.

10. The identity card of claim 8, the surfaces of the spaced surface elements of the first light influencing layer have equal or different dimensions than surfaces of the spaced surface elements of the second light influencing layer.

11. The identity card of claim 1, wherein the respective light influencing layer comprises spaced surface elements respectively having a wavelength-scale surface dimensions or thicknesses, or wherein the respective light influencing layer comprises spaced surface elements respectively spaced apart by a wavelength-scale distance, or wherein a distance between the first light influencing layer and the second light influencing layer is of wavelength scale.

12. The identity card of claim 1, wherein the first light influencing layer and the second light influencing layer jointly form an optical lens.

13. The identity card of claim 1, further comprising a light source for emitting light towards the first light influencing layer and the second light influencing layer, and an optical sensor for sensing light from the first light influencing layer and the second light influencing layer in response to the emitted light.

14. A method for manufacturing an identity card, the method comprising:
 providing a plurality of transparent laminate layers;
 arranging a first light influencing layer between successive two transparent laminate layers and arranging a second light influencing layer between successive two transparent laminate layers to obtain a physical unclonable function such that the physical unclonable function being positioned within the identity card; and
 laminating the transparent laminate layers and the physical unclonable function to obtain the identity card.

* * * * *